United States Patent [19]

Sowinski

[11] Patent Number: 5,515,715
[45] Date of Patent: May 14, 1996

[54] METHOD AND MEANS FOR FILTERING CONTAMINANTS FROM A GAS STREAM TO AID DETECTION

[76] Inventor: Richard F. Sowinski, 996 Arnold Dr., Martinez, Calif. 94553

[21] Appl. No.: 479,646

[22] Filed: Jun. 7, 1995

Related U.S. Application Data

[63] Continuation-in-part of Ser. No. 155,957, Nov. 19, 1993, Pat. No. 5,437,180.

[51] Int. Cl.$^6$ .................................................. G01F 1/00
[52] U.S. Cl. ................................... 73/40.5 R; 340/690
[58] Field of Search .......................... 73/40, 40.5 R; 340/614, 626, 690; 95/127, 147

[56] References Cited

U.S. PATENT DOCUMENTS

| B 530,709 | 4/1976 | Covington et al. | 73/40.5 R |
|---|---|---|---|
| 4,043,355 | 8/1977 | Cerruti et al. | 73/40.5 R |
| 4,051,715 | 10/1977 | Ledeen et al. | 73/40.5 R |
| 4,198,855 | 4/1980 | Tsujikura | 73/40.5 R |
| 4,604,899 | 8/1986 | Yamada et al. | 73/708 |
| 4,656,871 | 4/1987 | Czarnocki | 73/724 |
| 4,667,516 | 5/1987 | Schulz | 73/708 |
| 4,796,466 | 1/1989 | Farmer | 73/40.5 R |
| 4,798,093 | 1/1989 | Kenoun | 73/708 |
| 4,895,018 | 1/1990 | Asbra | 73/40.5 R |
| 4,998,434 | 3/1991 | Asbra | 73/40.5 R |
| 5,050,423 | 9/1991 | Czarnocki | 73/4 R |
| 5,149,343 | 9/1992 | Sowinski | 95/127 |
| 5,193,393 | 3/1993 | Czarnocki | 73/708 |

*Primary Examiner*—Richard Chilcot
*Assistant Examiner*—Ronald Biegel
*Attorney, Agent, or Firm*—Harold D. Messner

[57] ABSTRACT

A detector system and method for accurately indicating over- and under pressurization conditions within the piping network owned by the end user, includes the steps of: (a) introducing the natural gas stream to a filter selected from a group that includes at least activated charcoal and impingement adsorbing and absorbing media whereby natural gas contaminants concentrated in the gas stream at sufficient levels to be a detection threat by aperiodic loading of such network in which contaminants become clumped into packets due to dampening effects of the compressor-driven equipment and multiple customer outlet usage that add to aperiodic loading of the natural gas stream coupled with surprising longevity of the in situ contaminant, is filtered from the gas stream and captured, (b) passing filtered sample of natural gas and a sample of ambient air to a pair of identical systems excepting the set point level of each is formulated to indicated the occurrence of either an over-pressurization condition or of an under-pressurization condition wherein one or the other of the conditions within the end user's piping network is indicated, and (c) activating an indicating means to indicate to the end user the occurrence of the condition, by generation of a drive signal above a selected set point level] whereby inappropriate and unsafe operations of customer's appliances are avoided. The detection system uses a piezoresistive sensor which measures differential pressures between a filtered natural gas sample and a sample of ambient air entering the sensor to provide a pair of output signals.

14 Claims, 5 Drawing Sheets

METHOD AND MEANS FOR FILTERING CONTAMINANTS FROM A GAS STREAM TO AID DETECTION

RELATED APPLICATIONS

This Application is a continuation-in-part of Ser. No. 08/155,957 for "DETECTION OF NATURAL GAS WITHIN A CUSTOMER'S DOMAIN" filed Nov. 19, 1993, now U.S. Pat. No. 5,437,180 hereby incorporated by reference.

SCOPE OF THE INVENTION

The present invention relates to a method of filtering in association with detection of filter condition. More particularly, it relates to a filtering and detection method within the domain owned by a natural gas customer, say within the gas piping network owned by the end user-customer, such system or network being found between the gas meter maintained and owned by the natural gas supplier and the appliances owned and operated by the gas customer. Purpose: to eliminate natural gas contaminants concentrated within the piping network upstream of the filter assembly at sufficient levels to affect—nonlinearly—the operation of the filter assembly. As a further constraint, the sources of such contaminant concentration are identified. It is believed they result from aperiodic loading of such network in which contaminants become clumped into packets due to dampening effects of the compressor driven network and multiple customer outlet usage that adds the aforementioned aperiodic loading within the network.

DEFINITIONS

In this Application, "natural gas" means a mixture of gases associated with hydrocarbon accumulation within the earth as well as processed fuel gases derived from petroleum as well as mineral products such as coal in either gas or liquid phases. In some gas line networks, the resulting final gases may be a mixture from these two sources but wherein the essential component consists of methane.

"Contaminates within the natural gas stream sufficient to be a threat to detector operation" means contaminants within the natural gas that are recognized to inhibit seismic detector operations, such as dust, rust, moisture, oil, tars, olefines, odorants, oxides, etc.

"Adsorption" means filter media that captures molecules of gas, liquid or dissolved substance to the filter surface, by adhesion.

"Absorption" means fitter media that absorbs molecules of a gas, liquid or dissolved substance to the filter itself, by taking in through pores or interstices.

"Impingement" means filter media that captures molecules of a gas, liquid, solid or a dissolved substance to the filter by physical capture such as by change in velocity.

BACKGROUND OF THE INVENTION

The results of under-pressurization and over-pressurization of natural gas in customer's piping networks have been well documented: (i) Under-pressurization leads to unsafe use of the user's appliances such as production of increased amounts of formaldehyde, nitrous oxides, carbon monoxide and soot; (ii) Over pressurization can cause explosions, well documented by gas explosions in Alemeda County, Calif. in the 1990's.

Federal pipeline safety regulations have been proposed that require installations of excess flow valves in mitigating problems associated with over-pressurization of the gas source. However, experience has now shown that such valves do not operate properly due primarily to the problem of contaminant build-up at valve seats and valve plunger-liner interfaces. It is believed such build-up results from aperiodic loading of gas delivery network in which contaminants become clumped into packets due to dampening effects of the compressor driven network and multiple customer outlet usage that adds the aforementioned aperiodic loading within the network. Furthermore, in some circumstances noted in association with detection of under-pressurization, both the closure valve and its detection circuitry can be adversely affected by the presence of such contaminants.

In my application Ser. No. 155,957 for "DETECTION OF NATURAL GAS WITHIN A CUSTOMER'S DOMAIN" filed Nov. 19, 1993, now U.S. Pat. No. 5,437,180, hereby incorporated by reference, I teach that the temperature of the gas stream entering the end user's internal piping system has been found to be fairly stable (at about 50 degree F.) while the temperature of the end user's internal piping system (irrespective of total length) has been found to vary as a function of the ambient temperature exterior of the end user's internal piping system. Each of such temperatures can thus be used in association with a differential pressure sensing and conditioning circuit that uses a piezoresistive pressure sensor which measures differential pressures between the natural gas and ambient air entering the transducer to provide a pair of output signals, wherein the conditioned difference between these signals is related to the magnitude of flow of the natural gas based on sensed temperature changes at measured by first and second thermistors.

In such a sensor, there is provided four piezoresistive elements in or on a flexible diaphragm. Two ports are provided to provide ambient air and natural gas samples. When the diaphragm is flexed because of differential pressure, a stress is placed on the piezoresistive elements, causing them to change resistance. The resistance of such elements at any one time, is an accurate indication of differential pressure. But since both the resistance of the piezoresistive elements and its sensitivity to change as a function of stress, are dependent on a clean interface for natural gas passage, contamination due to impurities in the natural gas can unduly affect accuracy of results.

While my circuit can generate a correction voltage due to environmental changes such as temperature to adjust the differential signal, calibration may be difficult as a function of time when contamination build-up occurs due to aperiodic loading.

In the adjustment circuit set forth above, the sensor signal is adjusted to provide a desired output signal using the temperatures of the gas stream and the metal mass of the piping system of the end-user, such temperatures being introduced to the adjustment circuit via the first and second thermistors. Such output signal has also been found to be surprisingly indicative of small flow of natural gas from the gas network being monitored if the natural gas stream remains free of contamination. The final process signal is then further conditioned and used to drive the inverting input of an operational amplifier operating as a conventional comparator, such amplifier having its non-inverting input connected to ground through a voltage divider to establish a set point level whereby when the inverting signal is below the set point level, the output of amplifier goes HI to drive a visual, audio or other type of alarm circuit to alert the end-user of leakage flow of natural gas within his piping system. Such alarm circuits are conventional in the art.

In the present invention, instead of driving a single alarm circuit, a pair of differential pressure sensing and conditioning circuits each using a piezoresistive pressure sensor, are placed adjacent to each other along the piping network downstream of a filter assembly and conditioned to be alternatively activated as function of occurrence: (i) an under-pressurization condition leading to unsafe use of the user's appliances such as production of increased amounts of formaldehyde, nitrous oxides, carbon monoxide and soot; (ii) Over-pressurization condition that can cause explosions within the end user-customer's domain. Such activation can be automatically utilized such as to activate an alarm circuit to warn of the condition.

In more detail, within one of the circuits, the set point level is set at a low level where when the inverting signal is below such setpoint level, the output of amplifier goes HI to drive say, an associated alarm circuit. In the other circuit, the set point level is set at a high level where when the inverting signal is above the setpoint level, the output of the amplifier goes HI to drive, say the same associated alarm circuit.

Accordingly, the present invention provides an highly accurate detection method for both under pressurization and over pressurization of the natural gas as detected within the gas piping network owned by the customer, such system or network being found between the gas meter maintained and owned by the natural gas supplier and the appliances owned and operated by the gas customer. Such method takes into account temperature variations within the gas stream and exterior of the end user's internal piping system and provides for the absence of contaminants to inhibit detector operation due to the presence of the filter assembly between the gas meter owned by the gas supplier and the detection system of the invention. Note that such detection method occurs after the gas stream has been filtered to remove all substances that pose a threat to precise detector operation. That is, the detection system of the invention is downstream of the conventional gas meter owned by the gas supplier and a gas filtering system as previously taught in the patents cited above, such detection system providing an active indication of under and over-pressure conditions within the end user-customer's piping system or network whereby the set point level of the pair of comparator circuit is easily established for each such contition.

SUMMARY OF THE INVENTION

The present invention relates to a method of filtering, adjacent to the end user's home business or the like such as the adjacent gas distribution and processing system connected to the end user's meter, a gas stream in which a natural gas contaminants has been concentrated at sufficient levels to be a significant detection hazard. Steps of the invention include:

(a) introducing the natural gas stream to a filter selected from a group that includes at least activated charcoal and impingement adsorbing and absorbing media whereby natural gas contaminants concentrated in the gas stream at sufficient levels to be a detection threat by aperiodic loading of such network in which contaminants become clumped into packets due to dampening effects of the compressor-driven equipment and multiple customer outlet usage that add to aperiodic loading of the natural gas stream coupled with surprising longevity of the in situ contaminant, is filtered from the gas stream and captured, (b) passing the filtered natural gas stream to the customer's under-and over-pressurization detection circuitry wherein under pressurization and over pressurization conditions within the customer piping network are detected relative to set point levels, (c) activating an alarm to warn of under and/or over pressurization conditions within the customer's piping network when either of said set points levels is exceeded by a drive signal whereby inappropriate and unsafe operations of customer's appliances are avoided, (d) periodically and safely removing the filter of step (a) for disposing of the captured natural gas contaminants, (e) inserting a new filter in place of the removed filter of step (d).

DESCRIPTION OF A PREFERRED EMBODIMENT

Figure 1:
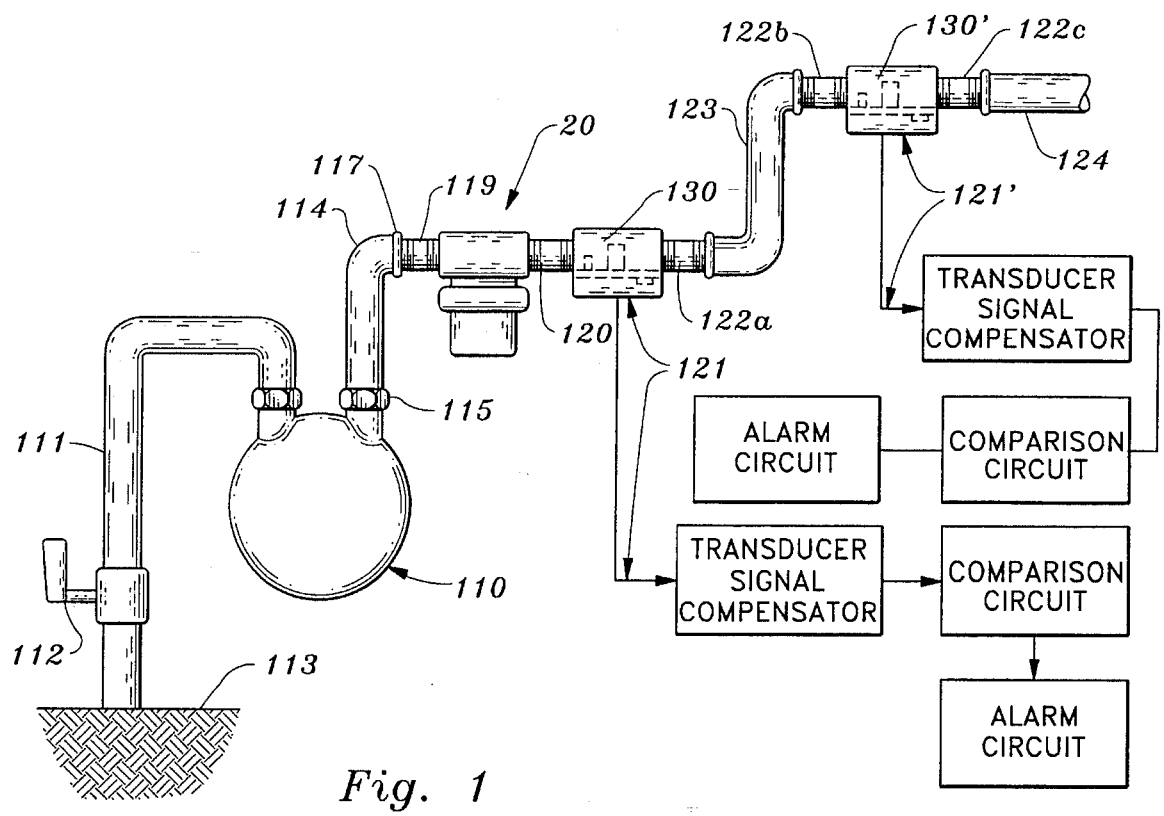
FIG. 1 is a side view of the detection system of the present invention positioned within the end user's internal piping system adjacent to a filtering assembly, such system including a pair of transducer signal compensating circuits in series with separate alarm circuits through comparison circuits.

FIG. 1 illustrates a gas meter 110 connected via upright gas pipe 111 and ON-OFF valve 112 to a main gas line network (not shown) downstream of the meter 10 below the earth's surface 113. Upstream of the meter 110 is a elbow 114 having a first end 115 connected to the meter 110 and a second end 117 connected to filter assembly 20 through a fitting 119. The filter assembly 20 in turn connects via outlet fitting 120 to a pair of detection systems 121, 121'. The first system 121 is connected to filter assembly 20 via fitting 120 and thence to second system 121' via fittings 122a, 122b and elbow 123. The second system 121' in turn, connects to inlet pipe 124 of the end-user's internal piping network via yet another fitting 122c. In operation, when valve 112 is open, the filter assembly 20 and the first and second detection systems 121, 121' operate in tandem as described in detail below, but when the valve 112 is deactivated, the natural gas flow to the filter assembly 20 and the detection systems 121, 121' is interrupted. The purpose of stopping gas flow as described above. However with interruption of the gas flow, the detection systems 121, 121' are activated as explained below.

Figure 7:
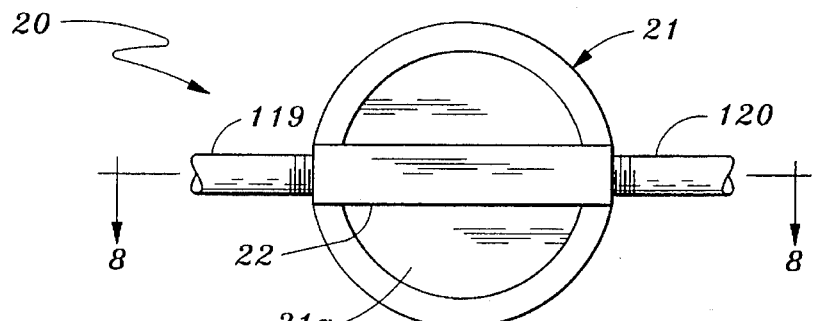
FIG. 7 is a top view of the filtering assembly of the invention.
Figure 8:
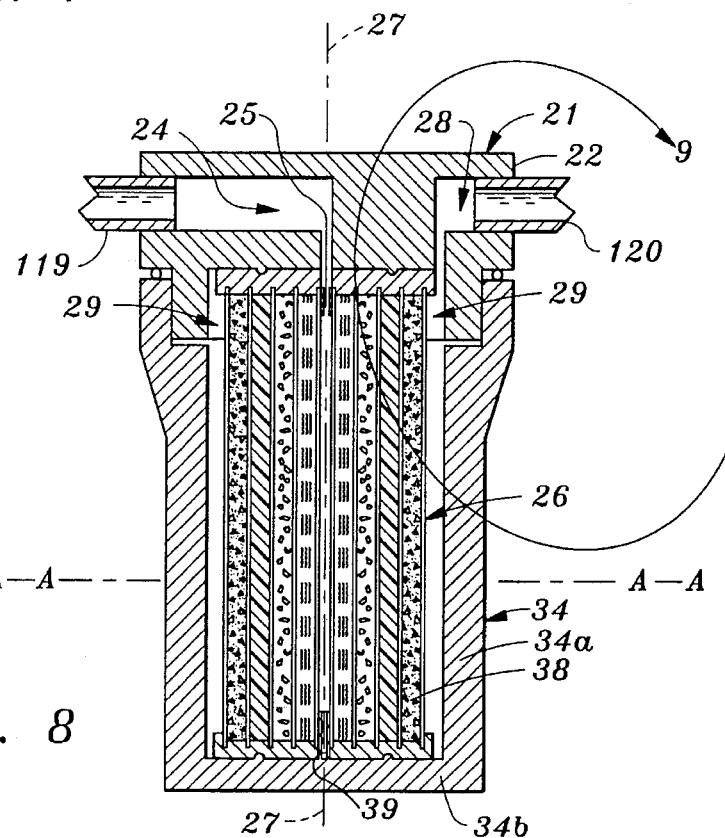
FIG. 8 is a section taken along line 8—8 of FIG. 7.
Figure 9:
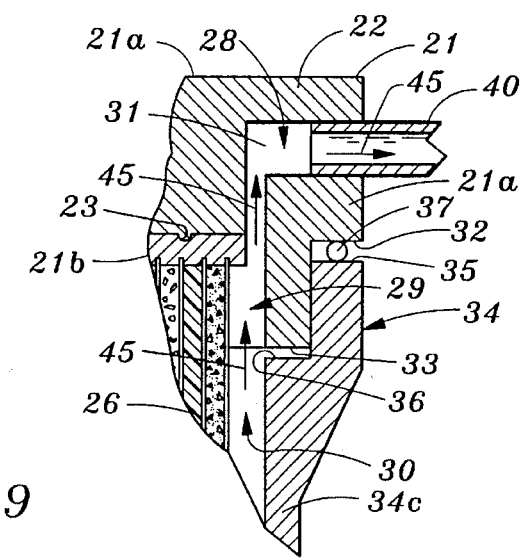
FIG. 9 is an enlarged detail view taken along line 9—9 of FIG. 8.

FIGS. 7, 8 and 9 show the filter assembly 20 in more detail.

As shown, the filter assembly 20 includes a cap 21 fitted with a rectangularly cross-sectioned dome 22 at its upper surface 21a, see FIGS. 8 and 9, to which the pipe fittings 119 and 120 attach. The cap 21 also has a lower surface 21b fitted with nipples 23 adjacent to a series of passageways that allow entry and egress of the gas stream: (i) inlet passageway 24 is L-shaped, is threadably connected to the inlet fitting 119 at one end of the inlet passageway 24. And the far end of the passageway 24, the passageway 24 is shown to connect via central annulus 25 to an interior filter media unit generally shown at 26 where media unit 26 is concentric of vertical axis of symmetry 27; (ii) an outlet passageway 28 that is bulbous over region 29 but in fluid contact with annular gathering region 30 that runs the full exterior of the filter media unit 26; the passageway 28 is then swedged over region 31 (in a L-shaped output form) at one end of bulbous region 29 for connection to outlet fitting 120.

The cap 21 also has an annular side wall 21a, see FIG. 9, and inwardly swedged at shoulder 32 and terminates at end 33. It s threaded therebetween to engage with cylindrical canister 34. The canister 34 includes a side wall 34a offset from the filter media unit 26 to form the annular gathering region 30 previously described and in addition, has shoulders 35 and 36. The region between the shoulders 35, 36 is threaded to engage cap 21. Between shoulders 32 and 35 of the cap 21 and canister 34, respectively, is grooved O-ring 37 to prevent gas leakage exterior of the filter assembly 20. The lengths of the engaging threaded portions of the cap 21 and canister 34 are constructed so that positive contact exists only at the O-ring 37 and not at shoulders 33, 36.

Canister 34 also includes a bottom wall 34b. The bottom wall 34b includes upwardly projecting nipples 38 concentric of a central annulus 39. The latter attach to the filter housing 26. The purpose of the nipples 23 and central annulus 25 of the cap 21 as well as that of the nipples 38 and central annulus 39 of the canister 34 is to fixedly receive and hold the filter media unit 26 relative to the cap 21 and canister 34.

Note that the direction of the gas stream at the interior of the filter assembly 20 is as taught by arrows 45, see FIG. 9. Such gas stream cannot pass directly from inlet passageway 24 to outlet passageway 28 but is prevented to such flow due to the length of the annuli 25, 39. Thus the gas flow is in a radially expanding, sinusoidal pattern normal to the axis of symmetry 27 about horizontal axis A—A of the filter media unit 26. The pattern begins at the axis of symmetry 27 and progresses through filter media unit 26, and ends exterior of the latter at annular gathering region 30. Thus the natural gas contaminants are filtered from the stream.

Figure 10:
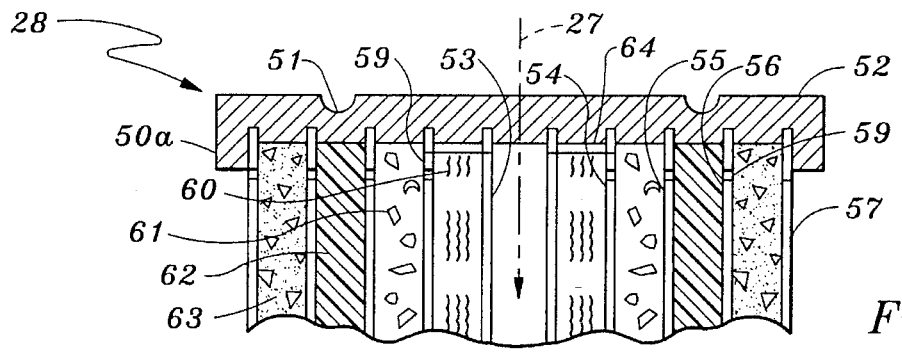
FIG. 10 is an enlarged detail of the filter media unit of FIG. 8.

FIG. 10 illustrates filter media unit 26 in more detail.

As shown, the filter media unit 26 includes end pieces 50a, 50b each having a circular notch 51 at outer surface 52 into which nipples 23, 38 of the cap 21 and canister 34, respectively, are received. Such construction permits the end pieces 50a, 50b of take up firm surface contact with the cap 21 and the canister 34 as the cap 21 is threaded to the latter.

Interior of the end pieces 50a, 50b are a series of concentric tubes 53, 54, 55, 56 and 57 fitted into the notches 51 of the former. The tubes 53–57 have side walls fitted with perforations 59. The side walls are normal to the horizontal axis of symmetry A—A previously mentioned, the latter being also normal to the vertical axis of symmetry 27. The perforations 59 permit gas flow in the sinusoidal-like, single pass filtering manner relative to axis A—A within the tubes 53–57 as indicated by arrows 45. As shown these arrows 45 begin near the vertical axis of symmetry 27 and serpentine outwardly in sinusoidal Fashion through the filter media unit 26.

Note that between the tubes 53 and 54; between tubes 54 and 55; between tubes 55 and 56 and between tubes 56 and 57 are separate filter medium 60, 61, 62 and 63 together forming a four-stage, single pass filtering media which in combination remove all traces of the odorant from the gas stream. The media 60–63 are each selected to remove contaminants from the stream in progressive fashion, viz., from microscopic to millimicrospic levels via single passage of the gas stream through each medium 60–63. However, the media 60–63 do not filter the methane from the gas stream.

Filter Medium 60

Figure 11:
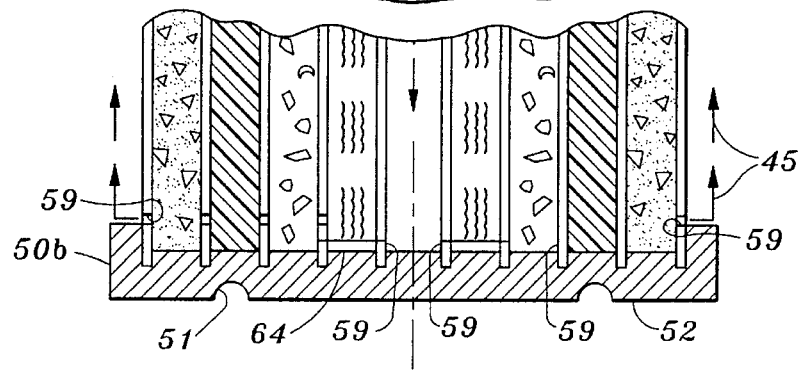
FIG. 11 is an enlarged detail of an insert ring used in the filter media unit of FIG. 8.
Figure 12:
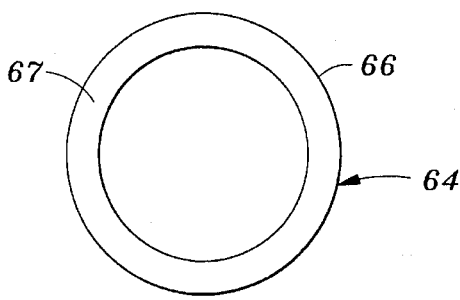
FIG. 12 is an alternate design for the filter unit of FIG. 8.

In this regard, filter medium 60 is preferably pleated filter paper having the following characteristics. Pleated filter paper 60 is widely available, performs impingement, absorption and adsorption and is made by conventional manufacturing processes including but not limited to methods involving weaving of cellulose, wool, acrylic, rayon fibers into corrugated sheet form. The tips and troughs of the corrugated pleated filter paper 68 of FIG. 10 are located in accordion fashion across and within the tubes 53, 54 but not in contact with the upper and lower end pieces 50a, 50b of the filter media unit. As shown in FIG. 11, a separate ring 64 is fitted in contact with each end piece 50a, 50b. The ring 64 of rectangular cross section, includes side wall 66 and terminating broad surface 67, that is compressively fitted in snug contact with the upper or lower end piece 50a, 50b. As a result, the gas stream can circulate in the manner shown and pass through the pleated filter paper 60 in single pass fashion between inlet and outlet perforations 59 associated therewith.

The density of paper 60 varies to provide filtering of the contaminants carried on dust, rust, dirt, moisture and oil laden particles in a range of 40 to 750 microns. It also retains both oils and moisture.

Filter Medium 61

In this regard, filter medium 61 is preferably silica gel crystalline form located between tubes 54 and 55.

Silica gel 61 is a conventional drying and dehumidifying agent formed of amorphous silica in crystalline form for filtering and trapping the odorant transported in solution with water, in gaseous form as well as aboard smaller diametered dirt and dust particles carrying contaminants piggyback. The gel absorbs moisture within the gas stream but not oils and is located between tubes 54 and 55. The medium 61 provides for single passage filtering operations only.

Calculations associated with the above are as follows:
AVERAGE NATURAL GAS USAGE Assume average gas use is 125 MSOF/YR, then per month usage cubic meters is 125 mcf/yr/12=10,416.6 cu. ft/month/35.3=295 cu. meters/month Assume the area between tubes 54, 55 is a function of mean diameter of 3⅝ inches, a height of 5 inches and thickness of 0.875 inches, then Filter volume=52.5 cu. inches;

Filter Medium 62

Filter medium 62 is preferably open pore polyurethane foam for capturing gas contaminants in gaseous form. Filter medium 62 filters by impingement and adsorption and retains micro vapors and solid particulates including oils and is located between tubes 55 and 56 for single pass filtering operations. It has the following characteristics.

Shape: Cylindrical shape from sheet form

Cellular Matrix Structure gas insert

Medium density—0.1 to 0.4 g/cu. cm matrix solid foam to gas insert

Porosity—0.14 to 0.41 (i.e. 70% to 90% open pore polyurethane)

Sample Period—2 months AT 100% Retention
  Well below breakthrough volume, viz., the point at which concentration of solute in the column effluent is half the concentration introduced into the column.

Volatility—Medium, See below

Preparation—Cut from foam sheets; air dry; install.

Pressure Drop—0.015 psi

Calculations associated with the above are as follows:

Assume average gas use is 125 MSCF/YR, then per month usage cubic meters is 125 mcf/yr/12=10,416.6 cu. ft/ month/35.3=295 cu. meters/month where: 0.0364 micro g/cu. meter per meter is gas odorant;

Hence: 295 cu.meter/month produces 10.738 micro g/mo of gas odorant;

And: 0.0027612 cu. cm required to remove above am't of gas odorant

*Filter volume*=408.28 cu. cm via 5 inches height by ½ inches thickness by 15.7 inches long;

Efficiency—700 cu. meters available

Change frequency=well within above pattern

Filter Medium 63

Furthermore, filter medium 63 is preferably granular activated charcoal located between tubes 56 and 57 for single pass filtering operations.

Granular activated charcoal is a conventional filtering medium, performs filtering on liquids, gases and solid particulates down to 10 Angstroms in size (but does not retain water) by impingement and adsorption and is prepared by carbonization of raw materials such as wood, coconut shell and coat. It attracts and holds the gas contaminants irrespective of the mode of transport such as a liquid or gas alone or piggyback aboard dirt and dust particles as well as with liquid plugs.

Physical properties:

Surface Area=600 to 1050 cubic meters per gm

Density=0.92 to 2.0 grams per cubic meter

Effective size=0.8 to 1.5 mm

Pore volume=0.6 to 1.7 cubic cm per gram

Mean diameter=1.2 to 1.7 mm

Sieve Size=No. 8 to No. 40 (U.S. Series)

Iodine No.=650 to 1,000

Calculations associated with the above are as follows:

Assume average gas use is 125 MSOF/YR, then per month usage cubic meters is 125 mcf/yr/12=10,416.6 cu. ft/month/35.3=295 cu. meters/month Assume the area between tubes 54, 55 is a function of a diameter of 7 inches, a height of 5 inches and a thickness of 0.5 inches, then Filter volume=55. cu. inches;

Density of GAO=0.30 oz./cu. in

GAC Aviail=16.5 oz.

Requirement to remove gas contaminants associated with 295 cu. meters is well within above change pattern.

Figure 2:
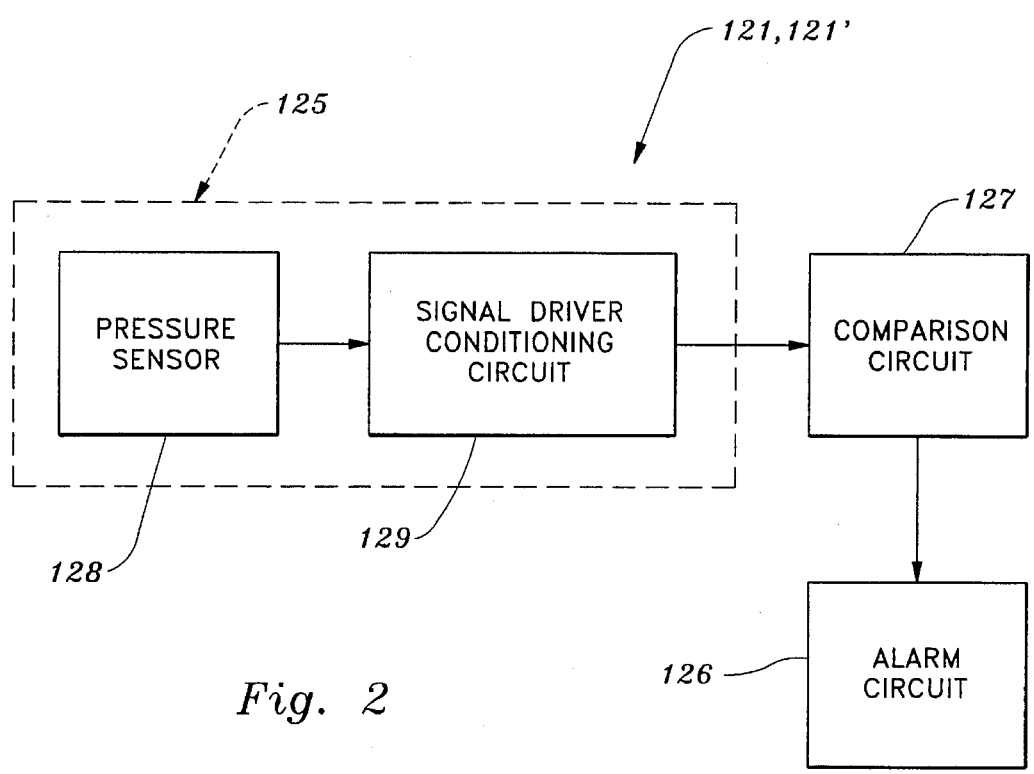
FIG. 2 is a schematic diagram of one of the pair of transducer signal compensating circuits of FIG. 1 in series with an alarm circuit through a comparison circuit.
Figure 3:
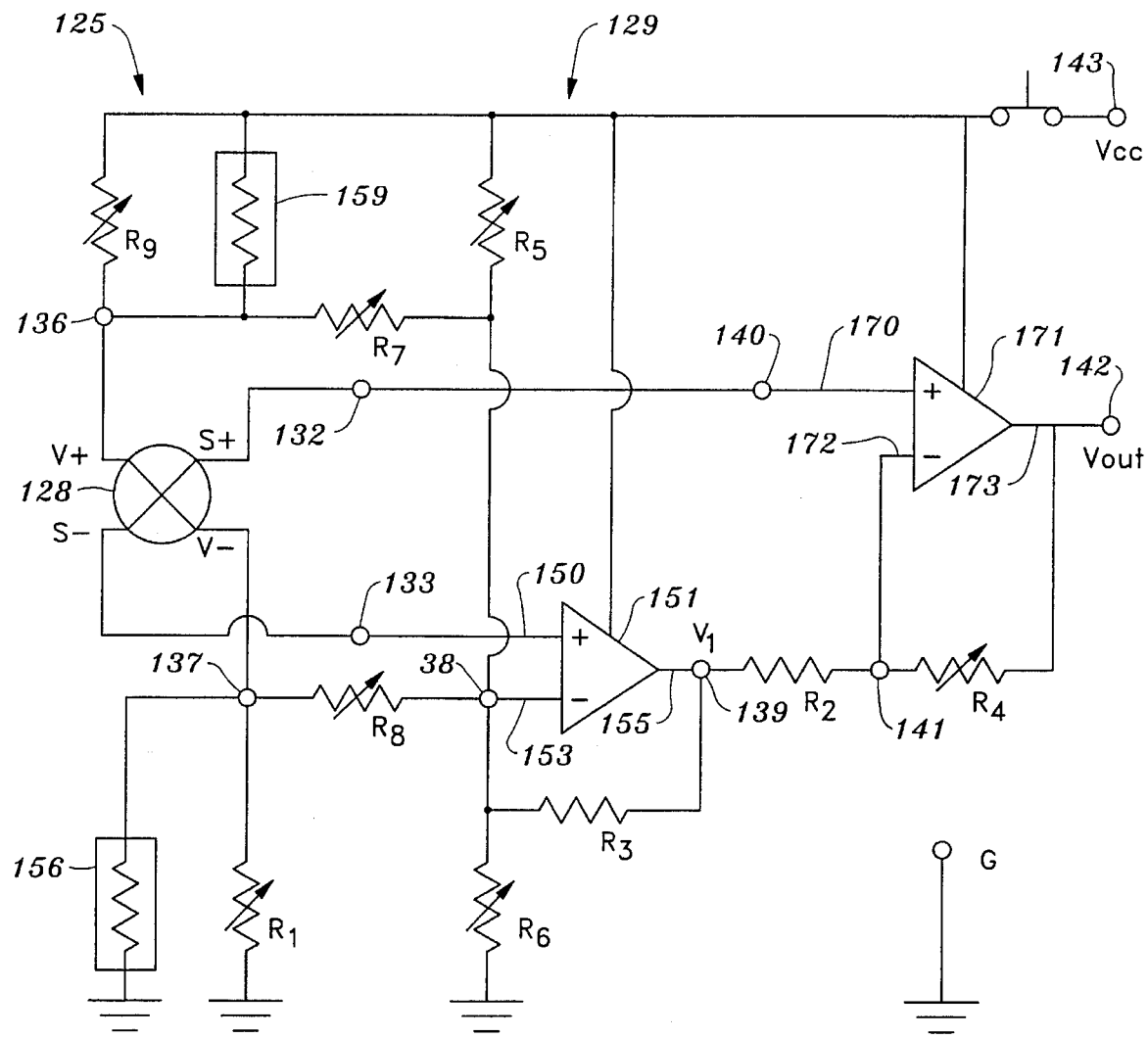
FIG. 3 is a schematic circuit diagram equivalent to FIG. 2.
Figure 4:
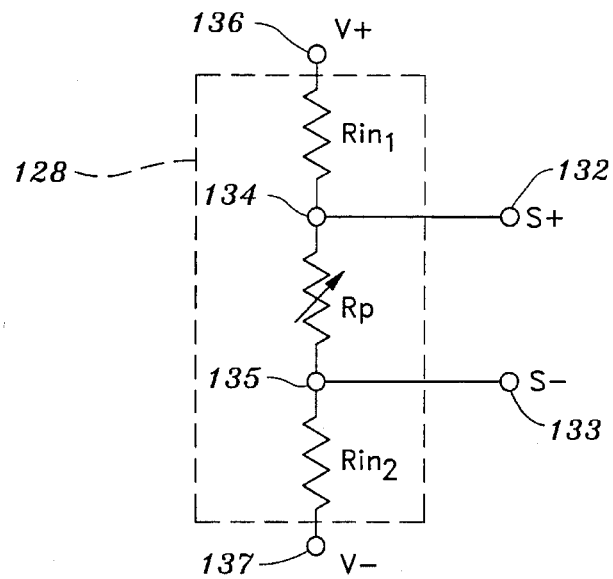
FIG. 4 is a schematic equivalent circuit diagram associated with the diagram of FIG. 3.

FIGS. 2, 3 and 4 illustrate the detection system 121 of the invention in more detail. Its operation is identical to that of the second detection system 121', so that a description of one, fits the other. However, detection of under-pressurization condition is indicated by first detection system 121, while over pressurization is indicated in second detection system 121' through adjustment in associated set point level.

As shown in FIG. 2, the system 121 includes a pressure senor-transducer and signal compensating circuit generally indicated at 125 connected to an alarm circuit 126 through a comparator circuit 127. As indicated below, the pressure sensor and signal compensating circuit 125 includes a pressure sensor 128 operationally connected to a signal driving and conditioning circuit 129. Each of the above circuits will be now described in detail.

FIG. 3 shows the pressure sensor 128 and the driving and conditioning circuit 129 of the pressure sensor transducer and signal compensating circuit 125 in more detail.

As shown the pressure sensor and signal compensating circuit 125 includes pressure sensor 128 for sensing differential pressure within a sensing pipe housing 130, see FIG. 1, through which is flowing natural gas and in response to both sampling the stream to provide both filtered gas sample and ambient air thereto, providing a first sensor voltage signal S+ and a second voltage sensor signal S−. These signals S+ and S− appear at first and second output terminals 132 and 133, respectively. The differential voltage between S+ and S−, is directly related to sensed differential pressure within the sensing pipe housing 130 of FIG. 1 as explained below.

Preferably, the sensor 128 is a piezoresistive pressure sensor. FIG. 4 illustrates a typical equivalent circuit thereof. As shown, the sensor 128 is seen to be equivalent to a pressure variable resistor Rp connected in series with non-pressure variable resisters Rin1 and Rin2. The resistor $R_p$ is seen to be located between terminals 134 and 135 which, in turn, are coupled to output terminal 132, 133, respectively, where the signals S+ and S− appear and across which differentially applied voltage of V+ and V− is applied via terminals 136, 137. It should be noted that while a series equivalent circuit for the sensor 131 is illustrated in FIG. 4, another schematic illustrations would be a bridge configuration. In such a bridge circuit a pressure independent resistor is connected with a pressure variable resistor with voltage differential of V+ and V− being applied across the bridge then provides a differential output of S+ and S− across output terminals 132, 133. Regardless of which equivalent circuit is utilized to depict the pressure sensor 128, the operation of the driving and conditioning circuit 129 of the pressure sensor transducer and signal compensating circuit 125 is identical. Again referring to FIG. 3, the sensor voltage signal S− is directly connected to a non-inverting input 150 of a first operation amplifier 151. The terminal 137 at which the applied voltage V− is provided, is connected through an adjustable resistor R8 to a terminal 138 which, in turn, is coupled to inverting input 153 of operational amplifier 151. Output 155 of the amplifier 151 connects to terminal 139 which is also connected through a negative feedback resistor R3 to terminal 138 and through a resistor R2 to terminal 141. The signal from the operational amplifier 151 appearing at output 155 and terminal 139 is designated V1 to indicated that this is an intermediate voltage signal, such signal V1 being directly related to the sensor output voltage signal S−. Terminal 138 is connected to ground through a variable resistor R6 and, in addition, is connected to a positive source of fixed voltage potential Vcc via terminal 143 through a variable resistor R5 and a switch 148. The switch 148 that is located adjacent to terminal 143, provides ON-OFF conditions for the circuit 125. The terminal 137 is connected to ground through the parallel combination of an adjustable resistor R1 and negative temperature coefficient thermistor 156 associated with the temperature of the mass of the side wall 163 forming a portion of the piping network of the customer. The terminal 136 is connected to the terminal 138 through a variable resistor R7 and is connected to the terminal 143 through the parallel combination of a variable resistor R9 and a positive temperature coefficient thermistor 159.

Figure 5:
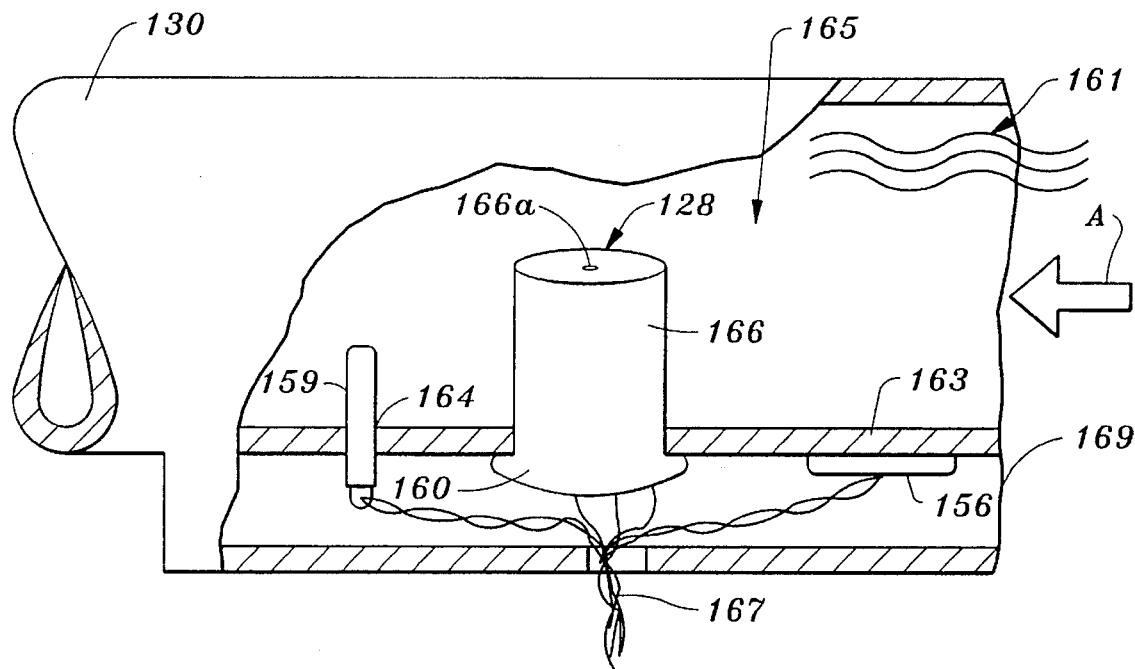
FIG. 5 is a detail side view of a gas piping system of FIG. 1 illustrating the positioning of selected elements of the one part of the detection system of FIG. 2.

FIG. 5 illustrates the positioning of the negative and positive temperature coefficient thermistor 156, 159 relative to sensing pipe housing 130 carrying natural gas generally indicated at 161. As shown, thermistor 156 attaches to exterior of side wall 163 of the pipe housing 160 while thermistor 158 extends interior of the side wall 163 into cavity 165 via opening 164 and terminates within the aforementioned cavity 165.

In addition, in FIG. 5 note that sensor 128 includes elongated cylindrical housing 166 that has a central entryway 166a in pressure contact with filtered natural gas that flows in the direction of arrow A. At the opposite end, the housing 166 is also provided with a second opening (not shown) adjacent to dome 160 in pressure contact with ambient air entering the housing 130 at opening 169. Such entryways permits both filtered gas and ambient samples to enter on two sides of the diaphragm (not shown) housed within the housing 166 of the sensor 128 whereby differential pressure therebetween is determined. Wiring harness 167 couples the thermistors 156,159 and the sensor 128 to the remaining circuit elements of the driving and conditioning circuit 129 of the pressure sensor transducer and signal compensating circuit 125 of FIG. 3.

Returning to FIG, 3, note that the sensor output signal S+ appearing at terminal 132 is connected to a terminal 140 and thence to non-inverting input 170 of a second operational amplifier 171 which has an inverting input 172 directly connected to the terminal 141. Output 173 of the amplifier 171 is seen to connect to terminal 142 and to variable feedback resistor R4 and thence to terminal 141. The signal at the terminal 142 is designated as Vout and has been provided with a desired pressure and temperature variation characteristic that takes into account the operational and temperature variations within the environment of the sensor 28, and more specifically takes into account the fact that a low gas flow provides a temperature variation within the thermistor 156 which is reflected in such characteristic.

Note that the pressure transducer and signal compensating circuit 125 implements all needed signal adjustments as well as reflects small temperature changes due to low gas flows within piping network of the end-user, such that output signal Vout has a desired pressure and temperature characteristics. That is, the resistor R9 and R1 associated with the operations of thermistor 156 are used to adjust the temperature coefficient of the span (gain). The resisters R7 and R8 associated with the operation of the thermistor 159 in the positive sense are used to adjust the temperature coefficient of the offset for the output signal Vout due to any non-pressure related difference between the signals S+ and S−. This is referred to as the temperature coefficient offset adjustment. The variable resistor R4 is used to adjust the absolute value of the span or gain. The resistor R5 and R6 are used to adjust the absolute value of offset. Once such adjustments—as noted above—in resistance levels are occurred, it has been found that accurate levels of gas flows can be indicated by small changes in the output of thermistors 156, 159.

Note that the circuit 125 of FIG. 3 can be shown to define a transfer function that is set forth in my above-identified application. In that transfer function, for a common mode gain of zero, the voltage Vout should only be a function of the difference between S+ and S−, since any equal shift of S+ and S− in the same direction should cancel out.

Figure 6:
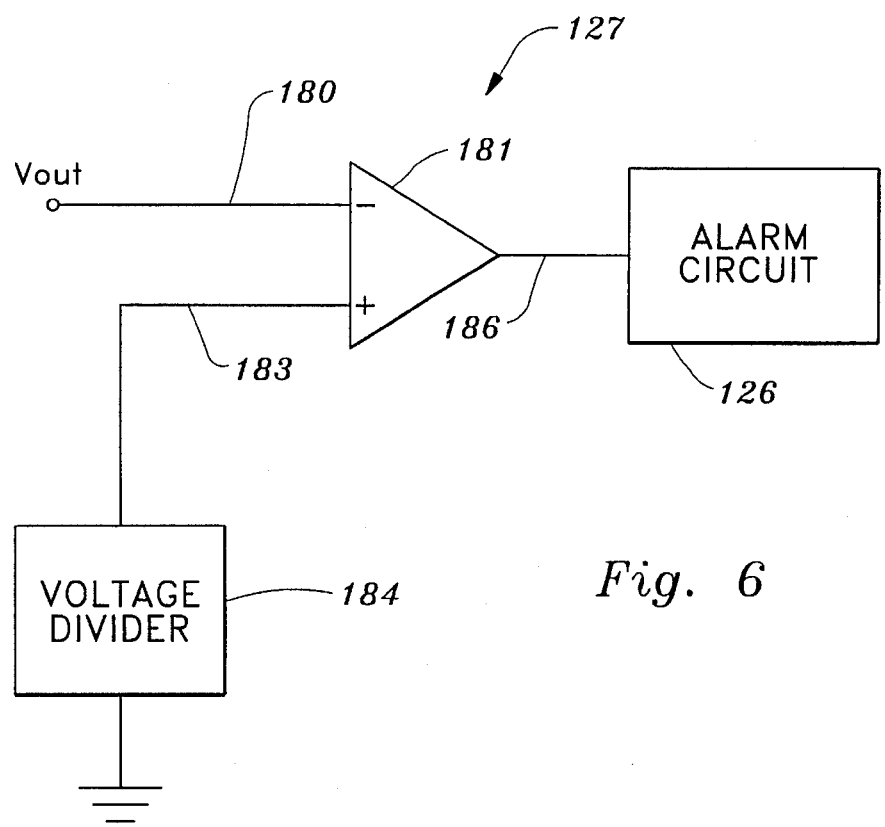
FIG. 6 is a detail schematic circuit diagram of the comparitor circuit of FIG. 2

FIG. 6 shows the comparator circuit 127 in more detail. The final process signal Vout is process by the circuit 127 as follows. The signal Vout is first conditioned to be a positive going signal and is then used to drive inverting input 180 of operational amplifier 181. The amplifier 181 is operating as a conventional comparator. Note that such amplifier 181 has non-inverting input 183 connected to ground through a conventional voltage divider 184 to establish a set point level whereby when the inverting signal Vout at inverting input 180 of the amplifier 181 is below the set point level, output 186 of the amplifier 181 goes HI to drive conventional alarm circuit 126 which can be a visual, audio or other type of alarm circuit to alert the end-user of the need to change the filter within the filter assembly 20 of FIG. 1. That is, since the alarm circuit 126 is conventional in the art, its descriptions will be dispensed with The above description contains several specific embodiments of the invention. It is not intended that such be construed as limitations on the scope of the invention, but merely as examples of preferred embodiments. Persons skilled in the art can envision other obvious possible variations within the scope of the description. For example, a current output signal rather than a voltage output signal rout can be used, such current signal retaining the basic principles disclosed and claimed herein. Hence the scope of the invention is to be determined by the appended claims and their legal equivalents.

What is claimed is:

1. A method for accurately determining occurrence of one of an over-pressurization condition or an under-pressurization condition in an end user-customer's piping network, comprising the steps of:

(a) introducing the natural gas stream to a filter selected from a group that includes at least activated charcoal and impingement adsorbing and absorbing media whereby natural gas contaminants concentrated in the gas stream at sufficient levels to be a detection threat by aperiodic loading of such network in which contaminants become clumped into packets due to dampening effects of the compressor-driven equipment and multiple customer outlet usage that add to aperiodic loading of the in natural gas stream coupled with longevity of the in situ contaminant, is filtered from the gas stream and captured, (b) passing an filtered sample of natural gas stream and a filtered sample of ambient air to a detector system wherein occurrence of one of an over-pressurization condition or an under-pressurization condition in an end user-customer's piping network, is accurately detected, based at least on pressure difference between the filtered gas sample and the sample of ambient air, (c) activating an indicating means to indicate to the end user-customer the occurrence of the one selected condition of step (b), by generation of a drive signal whereby inappropriate and unsafe operations of customer's appliances are avoided.

2. The method of claim 1 with the additional steps of:

(d) periodically and safely removing the filter of step (a) for disposing of the captured natural gas contaminants, (e) inserting a new filter in place of the removed filter of step (d).

3. The method of claim 1 wherein step (b) includes the substeps of (b') permitting entry of both the filtered natural gas and air on opposite side of a diaphragm of a piezoresistive sensor, (b") generating first and second signals wherein an differential signal thereof relates to the magnitude of sensed differential pressure therebetween relative to the sensor, (b''') adjusting the magnitude of the differential signal by providing a response output signal having a desired magnitude variation characteristic as a function of pressure and temperature, (b"") comparing said adjusted differential signal with a set point level wherein if said set point level is exceeded, the drive signal is generated for activation of an alarm circuit.

4. The method of claim 1 in which said impingement, absorbing and adsorbing media of step (a) for filtering said quadrant gas contaminants, are selected from the group consisting pleated filter paper, silica gel, open pore polyurethane foam and granular activated charcoal.

5. The method of claim 1 in which said impingement, absorbing and adsorbing media of step (a) comprises in series, pleated filter paper, silica gel, open pore polyurethane foam and granular activated charcoal whereby said natural gas contaminants are surprisingly removed from the natural gas stream.

6. The method of claim 1 in which step (a) is further characterized by aperiodic loading of in situ natural gas contaminants being the result of gas phase transition effects occurring within the natural gas gathering and distribution network owned by a gas supplier.

7. The method of claim 6 in which the aperiodic loading of step (a) is the result of dampening effects of compressor-driven equipment and usage of multiple outlets connected to the compressor-driven equipment within the natural gas gathering and distributing network.

8. The method of claim 7 in which the filtering occurs after the natural gas stream exits from the end user-customer's gas meter connected to one of the multiple outlets of the natural gas gathering and distributing network within the end-user-customer's natural gas piping network.

9. A method for accurately determining occurrence of one of an over-pressurization condition or an under-pressurization condition in an end user-customer's piping network, comprising the steps of:

(a) introducing the natural gas stream to a filter selected from a group that includes at least activated charcoal and impingement adsorbing and absorbing media whereby natural gas contaminants concentrated in the gas stream at sufficient levels to be a detection threat by aperiodic loading of such network in which contaminants become clumped into packets due to dampening effects of the compressor-driven equipment and multiple customer outlet usage that add to aperiodic loading of the natural gas stream coupled with longevity of the in situ contaminant, is filtered from the gas stream and captured, (b) passing an filtered sample of natural gas stream and a filtered sample of ambient air to a detector system wherein occurrence of one of an over-pressurization condition or an under-pressurization condition in an end user-customer's piping network, is accurately detected, based at least on pressure difference between the filtered gas sample and the sample of ambient air, (c) activating an indicating means to indicate to the end user-customer the occurrence of the one selected condition of step (b), by generation of a drive signal whereby inappropriate and unsafe operations of customer's appliances are avoided, (d) periodically and safely removing the filter of step (a) for disposing of the captured natural gas contaminants, (e) inserting a new filter in place of the removed filter of step (d).

10. The method of claim 9 in which said impingement, absorbing and adsorbing media of step (a) for filtering said natural gas contaminants, are selected from the group consisting pleated filter paper, silica gel, open pore polyurethane foam and granular activated charcoal.

11. The method of claim 9 in which said impingement, absorbing and adsorbing media of step (a) comprises in series, pleated filter paper, silica get, open pore polyurethane foam and granular activated charcoal whereby said natural gas contaminants are surprisingly removed from the natural gas stream.

12. The method of claim 9 in which step (a) is further characterized by aperiodic loading of in situ natural gas contaminants being the result of gas phase transition effects occurring within the natural gas gathering and distribution network owned by a gas supplier.

13. The method of claim 12 in which the aperiodic loading of step (a) is the result of dampening effects of compressor-driven equipment and usage of multiple outlets connected to the compressor-driven equipment within the natural gas gathering and distributing network.

14. The method of claim 9 in which the filtering occurs after the natural gas stream exits from the end user-customer's gas meter connected to one of the multiple outlets of the natural gas gathering and distributing network within the end-user-customer's natural gas piping network.

* * * * *